US010534426B2

United States Patent
Yang et al.

(10) Patent No.: US 10,534,426 B2
(45) Date of Patent: *Jan. 14, 2020

(54) INTERACTIVE SYSTEM, REMOTE CONTROLLER AND OPERATING METHOD THEREOF

(71) Applicants: PixArt Imaging Inc., Hsin-Chu County (TW); Nintendo Co., Ltd., Kyoto (JP)

(72) Inventors: Shu-Sian Yang, Hsin-Chu County (TW); Han-Ping Cheng, Hsin-Chu County (TW); Daisuke Kumazaki, Kyoto (JP); Yasuyuki Shimohata, Kyoto (JP); Yukihiro Ukai, Kyoto (JP)

(73) Assignee: PIXART IMAGING INC., Hsin-Chu County (TW)

( * ) Notice: Subject to any disclaimer, the term of this patent is extended or adjusted under 35 U.S.C. 154(b) by 60 days.

This patent is subject to a terminal disclaimer.

(21) Appl. No.: 15/897,959

(22) Filed: Feb. 15, 2018

(65) Prior Publication Data

US 2018/0173301 A1   Jun. 21, 2018

Related U.S. Application Data

(62) Division of application No. 15/000,426, filed on Jan. 19, 2016, now Pat. No. 10,055,011.

(30) Foreign Application Priority Data

Jan. 30, 2015   (TW) .............................. 104103379 A
Aug. 5, 2015    (TW) .............................. 104125540 A

(51) Int. Cl.
*G06K 9/00*   (2006.01)
*G06F 3/01*   (2006.01)
(Continued)

(52) U.S. Cl.
CPC .............. *G06F 3/011* (2013.01); *A63F 13/00* (2013.01); *A63F 13/213* (2014.09); *A63F 13/24* (2014.09);
(Continued)

(58) Field of Classification Search
CPC ...... G06F 3/011; G06F 3/0304; G06F 3/0346; A63F 13/213; A63F 13/24; A63F 13/426;
(Continued)

(56) References Cited

U.S. PATENT DOCUMENTS

| 10,055,011 B2 * | 8/2018 | Yang .................. G06K 9/00221 |
| 2007/0060336 A1 | 3/2007 | Marks et al. |
| 2014/0022168 A1 | 1/2014 | Kao et al. |

FOREIGN PATENT DOCUMENTS

| CN | 102300044 A | 12/2011 |
| CN | 102445179 A | 5/2012 |

(Continued)

*Primary Examiner* — Duy M Dang
(74) *Attorney, Agent, or Firm* — Hauptman Ham, LLP

(57) ABSTRACT

There is provided an interactive system, which includes a remote controller. The remote controller is equipped with a camera to capture an operating frame having a user image and a background image therein; and a processing unit to analyze the operating frame to identify a user image section and a background image section within the operating frame corresponding to the user image and the background image respectively, wherein the processing unit generates a movement information of the remote controller according to intensity distributions of the user image section and the background image section.

14 Claims, 9 Drawing Sheets

(51) Int. Cl.
  *A63F 13/213* (2014.01)
  *A63F 13/428* (2014.01)
  *A63F 13/426* (2014.01)
  *A63F 13/24* (2014.01)
  *A63F 13/655* (2014.01)
  *H04N 5/222* (2006.01)
  *G06T 7/73* (2017.01)
  *G08C 17/02* (2006.01)
  *G06F 3/03* (2006.01)
  *G06F 3/0346* (2013.01)
  *A63F 13/00* (2014.01)
  *G08C 17/00* (2006.01)

(52) U.S. Cl.
  CPC .......... *A63F 13/426* (2014.09); *A63F 13/428* (2014.09); *A63F 13/655* (2014.09); *G06F 3/0304* (2013.01); *G06F 3/0346* (2013.01); *G06K 9/00221* (2013.01); *G06K 9/00335* (2013.01); *G06K 9/00369* (2013.01); *G06T 7/73* (2017.01); *G08C 17/00* (2013.01); *G08C 17/02* (2013.01); *H04N 5/2226* (2013.01); *G06T 2207/10016* (2013.01); *G06T 2207/30201* (2013.01); *G06T 2207/30244* (2013.01); *G08C 2201/32* (2013.01)

(58) Field of Classification Search
  CPC ...... A63F 13/428; A63F 13/655; A63F 13/00; G06T 7/73; G06K 9/00221; G06K 9/00335; G06K 9/00369; G08C 17/00; G08C 17/02; H04N 5/2226
  See application file for complete search history.

(56) References Cited

FOREIGN PATENT DOCUMENTS

| CN | 102681654 A | 9/2012 |
|---|---|---|
| JP | 2004120514 A | 4/2004 |
| JP | 2006301906 A | 11/2006 |
| JP | 2008146164 A | 6/2008 |

\* cited by examiner

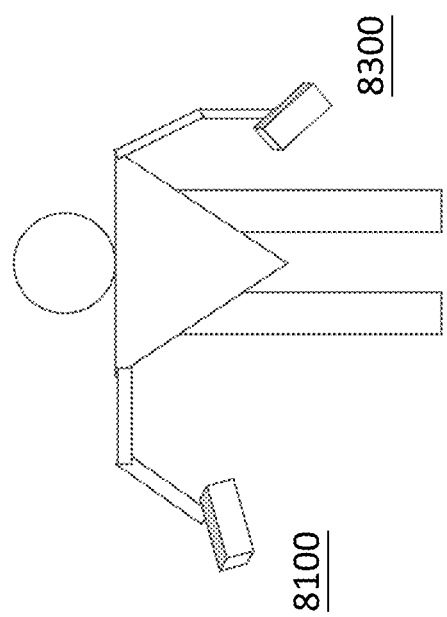

INTERACTIVE SYSTEM, REMOTE CONTROLLER AND OPERATING METHOD THEREOF

CROSS REFERENCE TO RELATED APPLICATION

This application is a divisional application of U.S. application Ser. No. 15/000,426, filed on Jan. 19, 2016, and claims the priority benefit of Taiwan Patent Application Serial Number 104103379, filed on Jan. 30, 2015 and Taiwan Patent Application Serial Number 104125540, filed on Aug. 5, 2015, the full disclosures of which are incorporated herein by reference.

BACKGROUND

1. Field of the Disclosure

This disclosure generally relates to an interactive system, more particularly, to an interactive system, a remote controller and an operating method thereof that generate interactive information according to a relative positional relationship between the remote controller and a user.

2. Description of the Related Art

A pointing device of the conventional interactive device is implemented by detecting a location of a specific object in an image. Because the specific object is immobilized relative to surroundings and a display device, the specific object has the fixed spatial relationship with respect to the display device. Therefore, a direction which is pointed by a camera can be calculated according to the location of the specific object in the image.

The method above is widely applied to pointing applications of televisions, gaming machines, etc. However, this method cannot calculate the position of a camera itself. Taking a gaming machine as an example, a user can aim at an object on a screen by a camera of a remote controller of the gaming machine, but the gaming machine can only calculate a coordinate position of the screen at which the user is aimed but cannot obtain a relationship between the user and a motion track of his/her hand according to images captured by the camera. Accordingly, the game type can be applied is limited.

SUMMARY

Accordingly, the present disclosure provides a calculation of a motion track of a user's hand by detecting a variation of a relative position between a remote controller and the user.

The present disclosure provides an interactive system, a remote controller and an operating method thereof that can recognize a user image region and a background image region within an operating frame in conjunction with a face recognition technology such that in calculating coordinates of the remote controller, the coordinates are calculated only according to parts of image region of the operating frame and ignoring other image regions of the operating frame.

The present disclosure provides a remote controller including a camera, a storage element and a processor. The camera captures an initial operating frame and a current operating frame having a user image and a background image. The storage element stores the initial operating frame, and a predetermined depth map and a predetermined location information corresponding to the initial operating frame. The processor changes the predetermined location information and the predetermined depth map to generate a plurality of estimated image frames according to the initial operating frame, compares the estimated image frames with the current operating frame to obtain a maximum similarity, and sets a location information of an optimum estimated image frame associated with the maximum similarity as a current location information of the remote controller.

The present disclosure further provides an operating method of a remote controller, and the remote controller includes a camera. The operating method includes the steps of: capturing an initial operating frame and a current operating frame having a user image and a background image by the camera; changing a predetermined location information and a predetermined depth map corresponding to the initial operating frame to generate a plurality of estimated image frames; comparing the estimated image frames with the current operating frame to obtain an optimum estimated image frame; and outputting a location information corresponding to the optimum estimated image frame as a current location information of the remote controller.

The present disclosure further provides an interactive system, and the interactive system includes a remote controller. The remote controller includes a camera and a processor. The camera captures an operating frame having at least a user image. The processor receives the operating frame, retrieves a face image from the operating frame, compares the face image with a face feature database to generate a face feature information, and compares the face feature information with face geometry database to obtain a camera posture of the camera.

BRIEF DESCRIPTION OF THE DRAWINGS

Other objects, advantages, and novel features of the present disclosure will become more apparent from the following detailed description when taken in conjunction with the accompanying drawings.

FIG. 9 is a schematic diagram of a user operating two remote controllers in one embodiment of the present disclosure.

DETAILED DESCRIPTION OF THE EMBODIMENT

It should be noted that, wherever possible, the same reference numbers will be used throughout the drawings to refer to the same or like parts.

The present disclosure adopts a whole new structure which disposes a camera on a handheld device, and a setting position of the camera is convenient for observing at least one of the user's head, shoulders and other parts of the body (abbreviated as a human body below). When the user is playing games, the camera observes the human body and a change of a background behind the human body with the motion of a user's hand, and a motion track of the user's hand is calculated to improve the game experience. The camera of the present disclosure does not capture an image in a direction of a display device so there is no need to provide a reference light source on or near the display device.

Figure 1:
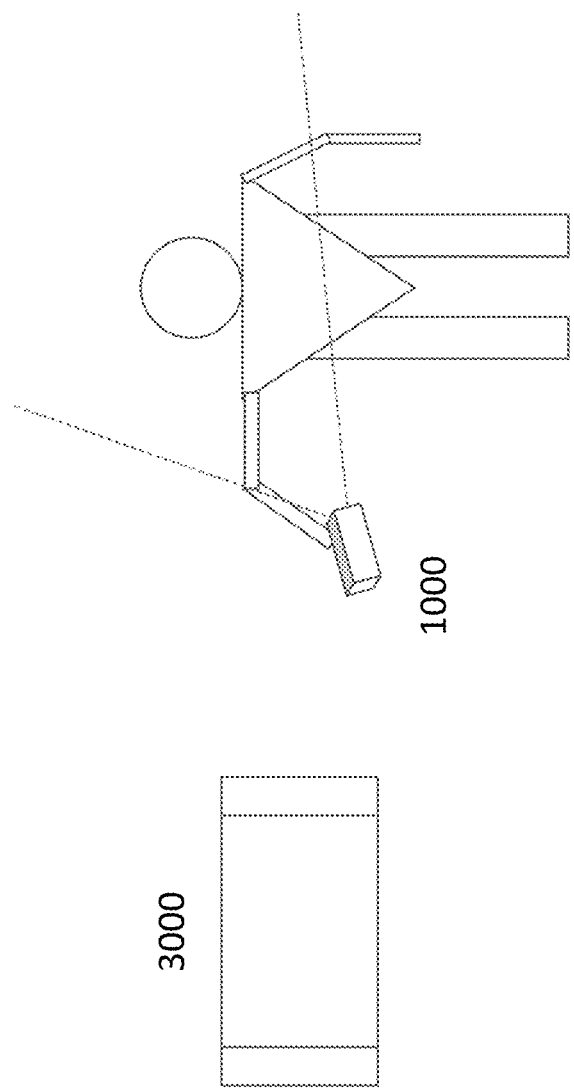
FIG. 1 is a system structure diagram of one embodiment of the present disclosure.

FIG. 1 is a system schematic diagram of an interactive system of the present disclosure. The interactive system includes a remote controller 1000 which detects a user's image, observes images of the user and the background from different directions, generates a movement information by calculating a variation of a relative location between the remote controller 1000 and the human body and/or between the remote controller 1000 and the background, and controls an operation of a display device 3000 according to the movement information (e.g. controlling a cursor movement of the display device 3000).

Figure 2:
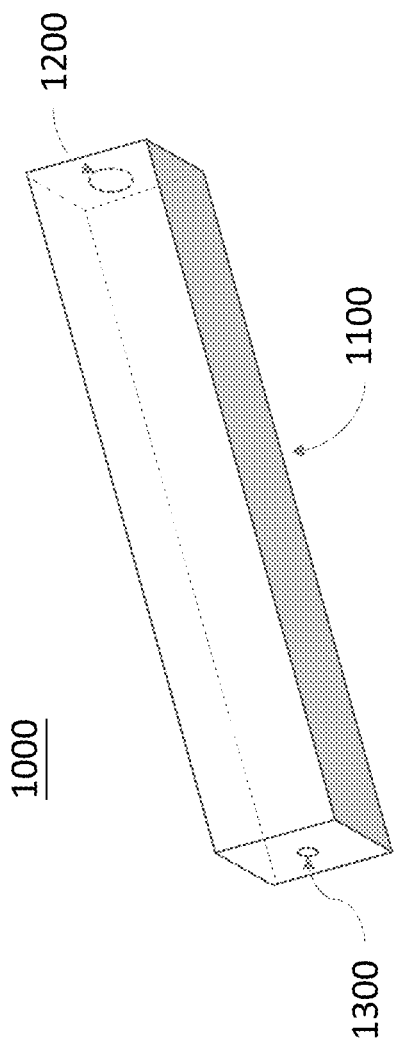
FIG. 2 is a schematic diagram of a remote controller in one embodiment of the present disclosure.

Referring to FIG. 2, the remote controller 1000 has a main body 1100, a camera 1200 and a light source 1300, wherein the main body 1100 preferably has a long shaft for being held by a user. The main body 1100 may have several buttons (not shown in the figure) as input elements of control signals. The camera 1200 is arranged at a first side of the main body 1100. When the user holds the remote controller 1000 during operation, the first side preferably faces the user to allow the camera 1200 to capture an image of a part of the human body and/or the background. The light source 1300 is arranged at a second side which is opposite to the first side and is configured as an indicator light (optional according to the system requirement) to provide the user a visual mark of the pointing input. To provide an obvious visual mark, the light source 1300 is preferred a laser projector light source which projects a light beam to the display device 3000 to indicate a current operation coordinate.

For example, the remote controller 1000 includes a processor, e.g., a microcontroller unit (MCU) or a central processing unit (CPU), to receive an operating frame captured by the camera 1200, analyze the operating frame to identify a user image region belong to a user image in the operating frame and a background image region belong to a background image in the operating frame, and generate a movement information of the remote controller 1000 according to the user image region and the background image region. The remote controller 1000 further includes a transmission interface for outputting the movement information in a wired or wireless manner to correspondingly control a cursor movement of the display device 3000. In some embodiments, it is possible to use only one of the user image region and the background image region to calculate coordinates of the remote controller 1000.

Figure 3:
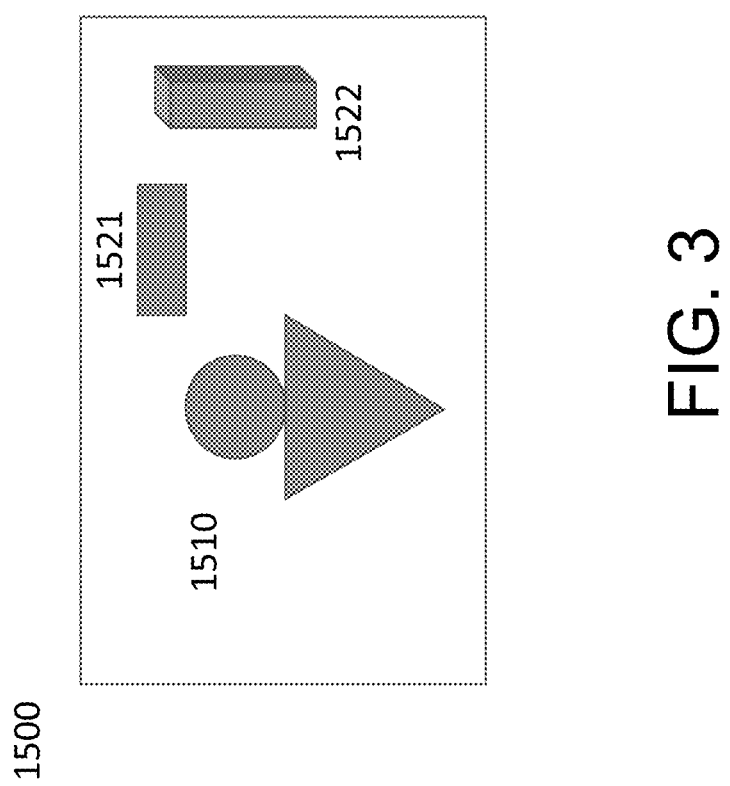
FIG. 3 is a schematic diagram of a captured image in one embodiment of the present disclosure.

As shown in FIG. 3, when the camera 1200 is capturing an operating frame 1500, a user image 1510 of the user and at least one background image 1521/1522 of the background are captured at the same time. It is appreciated that although FIG. 3 shows two background images 1521 and 1522, it is only intended to illustrate but not to limit the present disclosure. When the user is operating the camera 1200, the hand keeps moving continuously so the camera 1200 captures several operating frames from different viewpoints relative to the user and the background. A 3D vision associated with the human body and/or the background is simulated by using two operating frames from different viewpoints captured at different times, and thus the 3D positional relationship between the camera 1200, the human body and the background is established.

Because the operating frame 1500 includes both the user image 1510 and the background images 1521/1522, imaging positions of the user image 1510 and the background images 1521/1522 are changed when the user moves his/her hand. Therefore, the remote controller 1000 calculates the movement information of the remote controller 1000 according to the variation of the imaging positions of the user image 1510 and the background images 1521/1522. More precisely, the variation of the imaging positions in the operating frame 1500 is shown in the intensity distribution. If the user's hand holding the remote controller 1000 does not move but the user's upper body rotates, such as a game character holding a gun and turning left and right for observing in a shooting game, the imaging position of the user image 1510 is unchanged in the operating frame 1500 but the background images 1521/1522 in the operating frame 1500 are changed. Therefore, the remote controller 1000 is able to calculate the movement information of the user's rotation according to only the background images 1521/1522. In some embodiments, when objects included in the background are changed, the remote controller 1000 still can calculate the movement information of the user according to only the user image 1510 after recognizing the user image region and the background image region in the operating frame. In other words, in the present disclosure, the remote controller 1000 (e.g. the processor thereof) recognizes the user image region and the background image region within the captured operating frame 1500, and selects at least one of the user image region and the background image region to calculate a current location information of the remote controller 1000 under different conditions.

In one embodiment, when analyzing the operating frame 1500, the remote controller 1000 directly processes the whole image without further recognizing the user image 1510 and/or the background images 1521/1522. The remote controller 1000 directly identifies a variation of the intensity distribution of all pixels of the operating frame 1500 and further identifies variations of the distance and relative locations between each pixel and the camera 1200.

In another embodiment, when analyzing the operating frame 1500, the remote controller 1000 recognizes the user image 1510 (e.g. identifying a face by the face recognition technology and recognizing the image region having the same depth with the face as the user image 1510) and/or the background images 1521/1522 (e.g. identifying image regions outside the user image 1510 as the background images 1521/1522) according to the intensity distribution or other pixel information of the operating frame 1500, and identifies distances, inclinations and the variation of relative locations between the human body and the camera 1200 and/or between the background and the camera 1200 by the variation of imaging positions of the user image 1510 and/or the background images 1521/1522.

Figure 4:
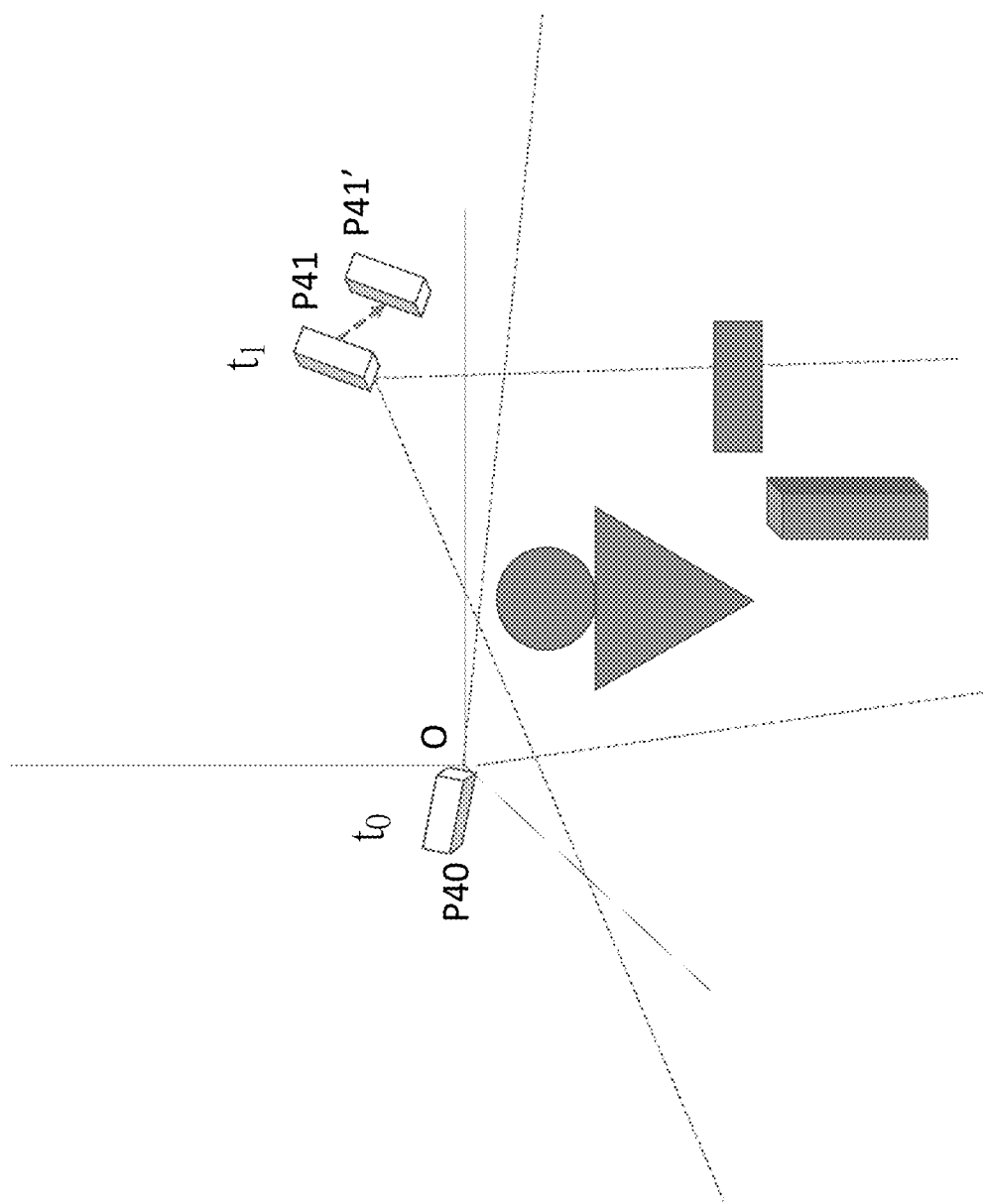
FIG. 4 is a schematic diagram of a three-dimensional coordinate space established by a camera in one embodiment of the present disclosure.

FIG. 4 is a schematic diagram of the three-dimensional positional relationship between the camera 1200 and the user and/or between the camera 1200 and the background. In one embodiment, a position P40 of the camera 1200 capturing a first image (e.g. referred to an initial operating frame) at time $t_0$ after starting a machine (or start operating) is set as an original point O of a 3D coordinate space, and a position P41 of the camera 1200 capturing a second image (e.g. referred to a current operating frame) at next time $t_1$ is set according to the 3D coordinate space which has the original point O at the position P40. The remote controller 1000 calculates a 3D coordinate of the position P41 according to the intensity distribution of two images. When the two images are successive images, a time difference between time $t_0$ and time $t_1$ is a sampling period. It is possible that the two images are not successive images.

Figure 5:
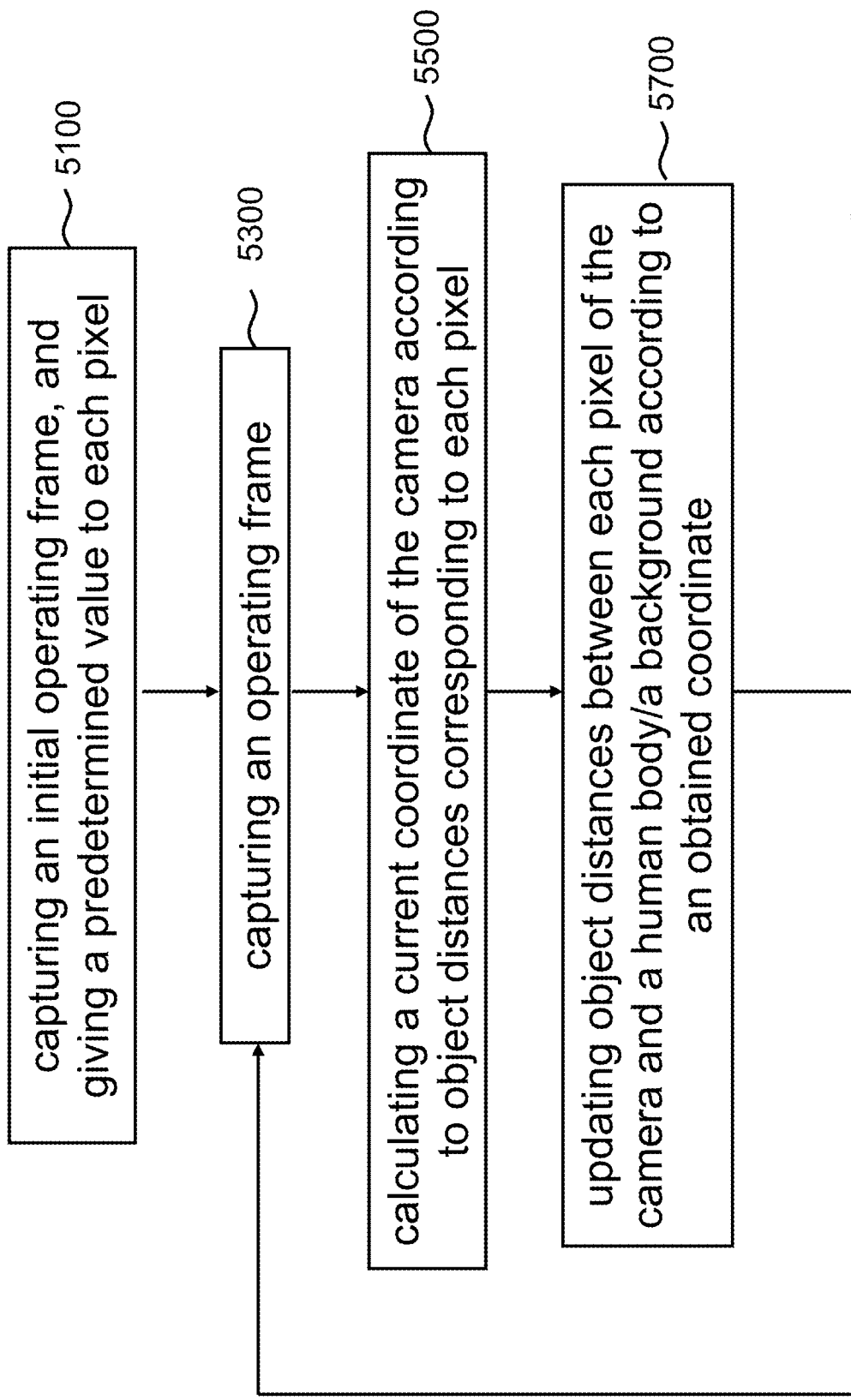
FIG. 5 is a flow chart of calculating and updating a camera coordinate and object distances in one embodiment of the present disclosure.

When calculating a 3D positional relationship, as the relative relations and distances between the user and the remote controller 1000 and/or between the background and the remote controller 1000 are unknown, it is possible to assume a set of basic parameters (e.g. including a predetermined depth map and a predetermined location information) at first and obtain more accurate 3D positional relationship by capturing operating frames several times and calculating repeatedly. Referring to FIG. 5, it explains the repeatedly calculating and updating the location of the camera 1200 and the distances between the camera 1200 and the human body as well as the background corresponding to each pixel (referred to object distances below) in the 3D coordinate space.

In step 5100, the camera 1200 captures an initial image of a first operating frame (referred to an initial operating frame), and the position P40 of the camera 1200 in 3D coordinate space is assumed as an original point O. The object distances corresponding to every pixel in the captured first operating frame is given a predetermined value (e.g. all the object distances being set as 1), wherein the given predetermined values of the object distances corresponding to the pixels is pre-stored, for example, in the remote controller 1000 or a storage element (e.g. a memory or a buffer) of the camera 1200.

In other words, when capturing the initial operating frame, the storage element stores at least a predetermined depth map of the initial operating frame, an intensity frame (i.e. the initial operating frame), a predetermined location information of the camera 1200 (e.g. 3D coordinates and 3D inclinations, but not limited to), and the imaging focus, wherein the predetermined depth map includes the object distances corresponding to each pixel (e.g. set as 1, but not limited to), the intensity frame includes gray values of each pixel, the 3D coordinates are set as, for example, (0,0,0), and the 3D inclinations include, for example, a first axis inclination, a second axis inclination and a third axis inclination which are all set as 0. The settings of the predetermined values are not limited to those given herein.

In step 5300, a current operating frame (e.g. the second operating frame) is captured by the camera 1200 according to an operating frequency, wherein the operating frequency is sometimes called as a frame rate. That is, in steps 5100 and 5300, the camera 1200 captures an initial operating frame and a current operating frame each having a user image and a background image.

In step 5500, a current coordinate of the camera 1200 is calculated and updated according to the object distances corresponding to each pixel as well as an image variation between a previous operating frame and the current operating frame captured by the camera 1200. Referring to FIG. 4, for example, a predetermined coordinate P40 of the camera 1200 at the first time $t_0$ is at the original point O (0,0,0) which is determined according to the initial operating frame captured in the step 5100. More precisely, the original point O is considered as an initial 3D spatial relationship of the remote controller 1000 or the camera 1200 relative to the human body. When capturing the second image at the second time $t_1$, a coordinate of the camera 1200 is calculated and updated as P1' (x1', y1', z1') which is determined according to the current operating frame captured in the step 5200. More precisely, the current coordinate P1' is considered as a current 3D spatial relationship of the remote controller 1000 or the camera 1200 relative to the human body. For example in one embodiment, the remote controller 1000 includes a processor which changes the predetermined location information and the predetermined depth map to generate a plurality of estimated image frames according to the initial operating frame by image processing (e.g. a set of 3D coordinates, 3D inclinations and depths for generating one estimated image frame). The processor compares the estimated image frames and the current operating frame to obtain a maximum similarity, and sets a location information of an optimum estimated image frame corresponding to the maximum similarity as a current location information of the remote controller, e.g., including a 3D coordinate and a 3D inclination.

A method of the remote controller 1000 calculating a current coordinate of the remote controller 1000 or the camera 1200 relative to the original point O according to the current operating frame is given herein. More precisely, the processor successively generates possible intensity distributions of the current operating frame corresponding to different coordinates (i.e. changing the location information and depth information) to be served as estimated image frames. When one of the estimated image frames has the highest similarity to the current operating frame captured by the camera 1200, the estimated image frame having the highest similarity is taken as an optimum estimated image frame. It is appreciated that as the optimum estimated image frame is confirmed by the remote controller 1000 using image comparison, it is possible that the intensity distribution of the optimum estimated image frame is not exactly identical to the current operating frame. Or, it is possible to provide a threshold to confirm whether to stop the comparison process, and the estimated image frame having the similarity exceeding the threshold is taken as the optimum estimated image frame.

In step 5700, the object distances between the camera 1200 and the human body or between the camera 1200 and the background are recalculated and updated according to the updated coordinates (e.g. P1') of the camera 1200, and the process returns to step 5300.

It is appreciated that the object distances corresponding to each pixel of the camera 1200 is directly read from the stored object distance values (e.g. when capturing the second operating frame, the pre-stored predetermined values of the object distances given to each pixel being read; when capturing a third operating frame or following operating frames, the updated object distances being read) in the step 5500, and the read object distances are not the real distance corresponding to each pixel between the camera 1200 and the user or the background. Therefore, there is a difference existed between a new calculated coordinate P1' (x1', y1', z1') of the camera 1200 and a real coordinate P1 (x1, y1, z1) of the camera 1200. After operating steps 5300/5500/5700 several times, the difference between the calculated coordinate Pn' of the camera 1200 and the real coordinate Pn of the camera 1200 is gradually decreased by updating the coordinate several times. The remote controller 1000, for example, outputs the coordinate P1' (x1', y1', z1') to a host for corresponding control.

Of course, in one embodiment the remote controller 1000 further includes a distance measurement element (not shown) such that the remote controller 1000 is able to retrieve real object distances corresponding to all the pixels of the camera 1200, and the step 5700 can be ignored.

When the camera 1200 captures the operating frame again (e.g. the third operating frame), the coordinate of the camera 1200 and the object distances corresponding to each pixel are obtained and updated by the step 5500 and the step 5700. Therefore, the calculated coordinate and the real coordinate of the camera 1200 are closer to each other by capturing the operating frame several times and repeating the steps 5500 5700. Meanwhile, the calculated object distances corresponding to each pixel (e.g. the predetermined depth map) are closer to the real object distances. Hence, in some embodiments, the camera 1200 further includes a calibration step, which is executed at the starting, end of the sleep mode or selected by a user to improve the operation accuracy.

It is appreciated that in order to improve the operation stability, it is possible to return to the step 5100 when the remote controller 1000 operates after every predetermined time. Or the operation state of the camera 1200 is reset to return to the step 5100 when a specific percentage of the pixels whose calculated object distances having a variation with respect to the object distances obtained in a previous image (or the initial operating frame) larger than a threshold or whose calculated object distances are unable to be calculated.

Figure 6:
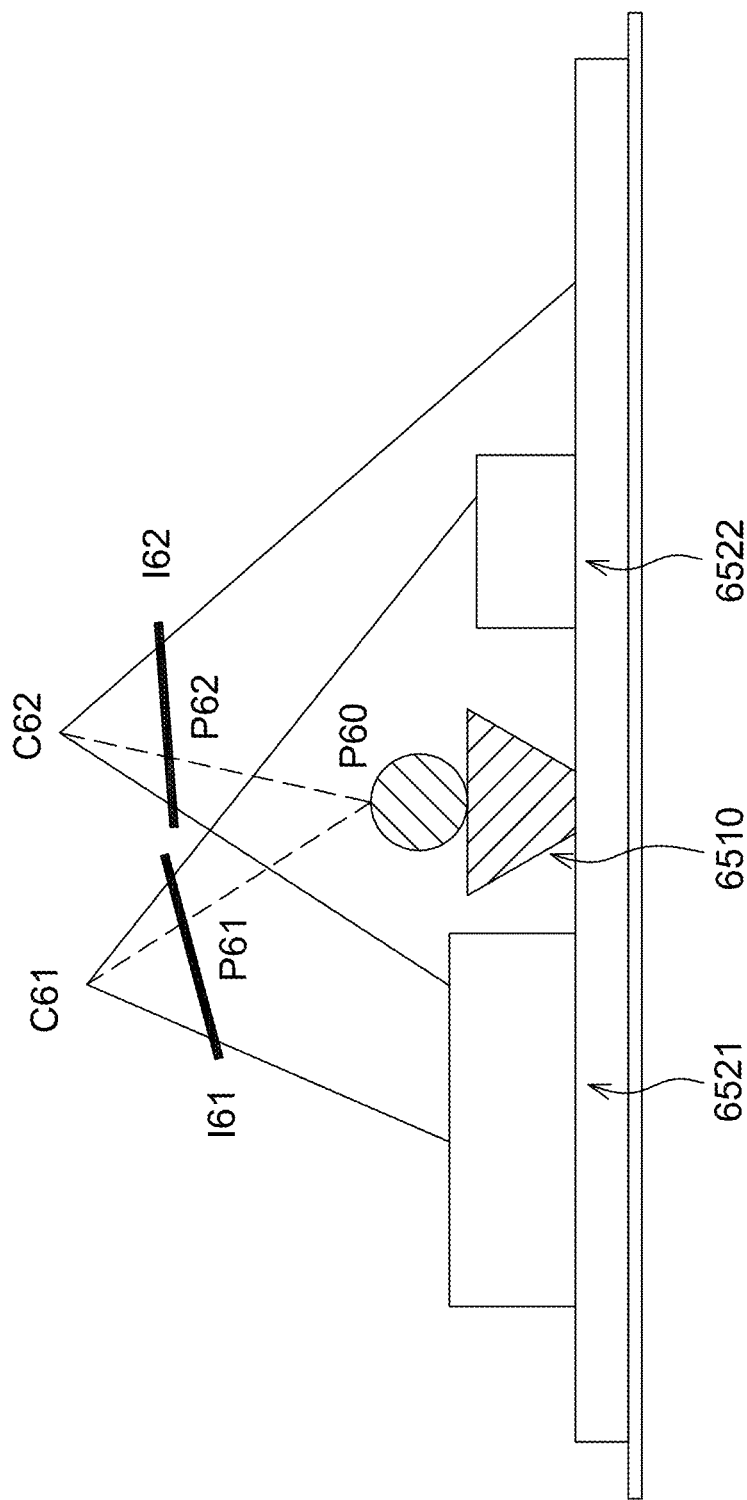
FIG. 6 is a schematic diagram of calculating and updating a camera coordinate in one embodiment of the present disclosure.

FIG. 6 is a schematic diagram of updating a camera coordinate in step 5500. In the step 5500, after the object distances (e.g. the predetermined depth map) corresponding to each pixel of the camera 1200 is read, these object distances are considered as the object distances corresponding to each pixel when the camera 1200 captures a previous operating frame (or an initial image frame). A new coordinate of the camera 1200 is calculated according to these object distances.

In one embodiment, when the camera 1200 captures two operating frames I61/I62 respectively from two positions C61 and C62 and at two successive times (e.g. $t_0$, $t_1$), the captured operating frames I61/I62 both cover the human body 6510 and the background 6521/6522 (method of recognizing the human body and the background being described above), wherein the imaging position of a feature point P60 of the human body 6510 in the two operating frames I61/I62 are shown as P61/P62, respectively. The processor changes, e.g. by an algorithm, the predetermined location information and the predetermined depth information (e.g. pre-stored in the storage element) corresponding to the initial operating frame (e.g. I61) to generate a plurality of estimated operating frames which are for simulating the intensity distributions of the operating frame I62 at different positions. The processor compares, e.g. by calculating correlations, the similarity of the estimated operating frames with the operating frame I62 and sets the location information corresponding to an optimum estimated operating frame which has the highest similarity to the current location information of the operating image I62. As mentioned above, the processor compares the similarity of at least one of the user image region and the background image region within the current operating frame with corresponding regions (i.e. the user image region and the background image regions) within the estimated image frames, e.g. calculating the correlation between corresponding regions.

It is appreciated that the feature point P60 used for identifying the variation of imaging positions is generally the point easily being recognized in the captured operating frame, e.g. a feature point corresponding to a pixel which has an intensity value exceeding a threshold or a group of feature points such as a feature point set corresponding to a set of pixels having identical or similar intensity values.

The more feature points for identification are used, the more accurate location variation of the camera 1200 is calculated. If a pixel number of the feature points for identification is lesser than a threshold, the remote controller 1000 returns to the step 5100 to recapture an initial operating frame. Of course, the object distances corresponding to each pixel of the recaptured initial operating frame may use pre-stored predetermined values (e.g. 1) or the latest updated object distances corresponding to a previous operating frame which is valid for calculating the location variation of the camera 1200.

In another embodiment, firstly one or several feature points P60 or a set of feature points are recognized in successive operating frames I61/I62, and then the coordinate variation of positions C61/C62 at which the camera 1200 captures the two operating frames I61/I62 are calculated according to the similarity of these features P60 or the set of feature points.

Figure 7:
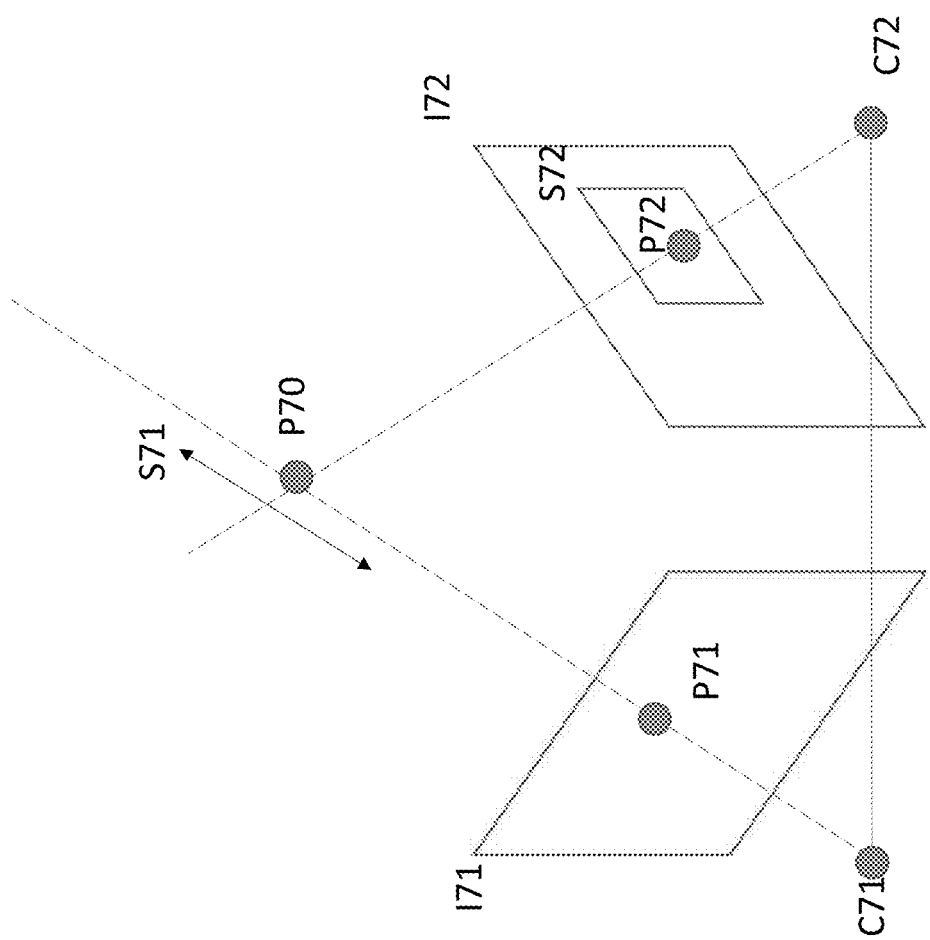
FIG. 7 is a schematic diagram of calculating and updating object distances of a camera in one embodiment of the present disclosure.

FIG. 7 is a schematic diagram of updating the object distances corresponding to each pixel (i.e. updating the stored depth information) in the step 5700. In the step 5700, the coordinate of the camera 1200 when capturing the current operating frame is obtained in the previous step 5500 so the object distances corresponding to each pixel of the camera 1200 are calculated and updated according to the coordinate variation of the camera 1200 when capturing two successive operating frames.

When the camera 1200 captures a previous operating frame I71 on the coordinate C71 (e.g. corresponding to the position C61 in FIG. 6), an imaging position of the feature point P70 in the operating frame I71 is shown as P71. When the camera 1200 captures the current operating frame I72 (e.g. corresponding to the position C62 in FIG. 6), the coordinate is moved to C72. It is able to obtain the coordinates of C71/C72 and the location variation therebetween according to the previous step 5500.

Because the remote controller 1000 has stored the previously updated object distances, a searching distance S71 is set according to the updated object distance of the feature point corresponding the feature point P70 in the operating frame I71 (e.g. a predetermined distance moved forward or backward from the currently updated object distance). Because the current coordinate C72 of the camera 1200 is known, a searching range S72 corresponding to the searching distance S71 in the operating image I72 is defined by using the triangulation according to the searching distance S71 and the coordinate C72, and the pixel P72 corresponding to the imaging position of the feature point P70 is found from the searching range S72. Therefore, the object distance between the feature point P70 and the camera 1200 on the coordinate C71 is calculated according to successive coordinate variations of C71/C72, the object distance corresponding to the feature point P70 in the previous operating frame I71, and the pixel position P72 corresponding to the feature point P70 in the current operating frame I72. Accordingly, the remote controller 1000 updates the stored object distance corresponding to the feature point P70. The remote controller 1000 continuously updates the object distance (i.e. the depth map) stored in the storage element according to new current operating frames.

In one embodiment, one of several feature points P70 or a set of feature points are recognized from the successive operating frames I71/I72 at first, and the object distance of the camera 1200 corresponding to the feature points P70 or the set of feature points is calculated from the variations of the imaging positions of these feature points P70 or the set of feature points when the camera 1200 is capturing the current operating frame I72.

It is known from above, when a user holds the main body 1100 of the remote controller 1000 and moves the remote controller 1000 continuously, the relative movement of the camera 1200 is calculated by the operating frames continuously captured by the camera 1200, and the relative movement of the remote controller 1000 is calculated as well.

In one embodiment, it is able to execute a calibration step, i.e. the user uses a laser light source 1300 of the remote controller 1000 to project a light beam at a specific target point of the display device 3000 so as to establish a connection between the 3D coordinate space of the camera 1200 and a coordinate space of the user and the display device 3000. In this way, the user is able to directly perform a pointing control.

In one embodiment, the user and the background image regions in the captured operating image is further separated, e.g. using the intensity value of each pixel in the operating frame to separate, and the foreground (e.g. the user image region) and the background (e.g. the background image region) are recognized by this method. The user image is further separated from the captured operating frame and further provided to back-end programs for recognition, e.g. analyzing the user's face or calculating the location of the camera 1200 by the relative relation between the camera 1200 and human body.

Figure 8:
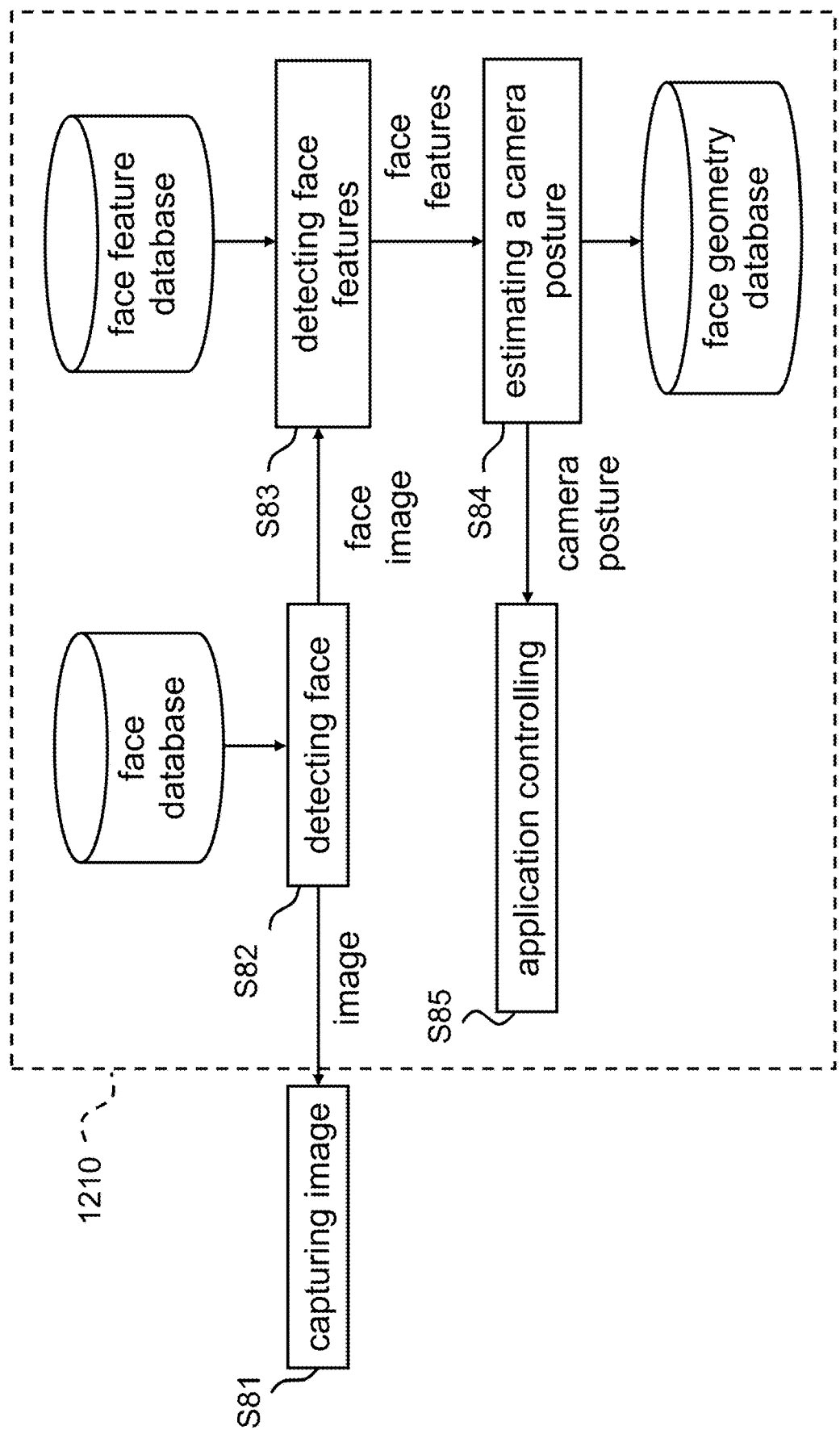
FIG. 8 is a flow chart of establishing three-dimensional location information according to the face analyzing in one embodiment of the present disclosure.

Referring to FIG. 8, it is a flow chart of establishing three-dimensional (3D) location information according to a face analyzing, including the steps of: capturing an image (step S81); detecting a face (step S82); detecting face features (step S83); estimating a camera posture (step S84); and application controlling (step S85), wherein the steps are processed, for example, by the processor 1210 in the camera 1200. As mention before, the 3D location information (i.e. the camera posture) includes, for example, the 3D coordinate and 3D inclination. In this embodiment, the processor 1210 obtains the 3D location information according to one operating frame. The processor 1210 includes face database, face feature database and face geometry database which are pre-stored in the processor 1210, e.g. a memory or a buffer. As mention before, the processor 1210 is a microcontroller unit or a central processing unit.

Step S81: The camera 1200 of the remote controller 1000 captures an operating frame including at least one user image (as shown in FIG. 3), and transmits the operating frame to the processor 1210 for post-processing. It is appreciated that the operating frame includes other object images in addition to the user image.

Step S82: The processor firstly compares the operating frame with the face database to retrieve a face image from the operating frame and ignore image information (i.e. pixel information) outside a range of the face image. e.g. removing from the buffer or not being calculated in calculation. The processor 1210 includes, for example, a face detection engine (implemented by software and/or hardware) for generating the face image by comparing with the face database using a face detection algorithm, wherein the used face detection algorithm does not have particular limitations. e.g. referring to U.S. Patent Publication No. US 2010/0328498 A1 published on Dec. 30, 2010, U.S. Patent Publication No. US 2010/0328442 A1 published on Dec. 30, 2010 and U.S. Patent Publication No. US 2010/0329518 A1 published on Dec. 30, 2010. In another embodiment, the processor 1210 retrieves the face image from the operating frame by parameters such as area and/or shape in place of using the face detection algorithm. For example, an area of the image region is larger than a predetermined area threshold and/or a shape of the image region matches a predetermined shape, wherein the image region is a pixel region having gray values within a predetermined gray value range.

Step S83: The processor 1210 then compares the face image with the face feature database to generate a face feature information, wherein the face features include, for example, a 2D location of at least one of facial features, eyebrows, chin and contour. The processor 1210 includes, for example, a face detection engine (implemented by software and/or hardware) used to compare a plurality of face features in the face image and obtain the corresponding 2D locations. In other words, the face feature information includes 2D locations of a plurality of face features in the face image, wherein the face features are defined according to the face detection algorithm used by the face detection engine or the face features pre-stored in the face feature database without particular limitations.

Step S84: The processor 1210 then compares the face feature information with the face geometry database to calculate a camera posture of the camera 1200, e.g. 3D location information. In other words, the face geometry database includes 3D locations of the face features. The processor 1210 includes, for example, a posture estimation engine (implemented by software and/or hardware) which obtains the camera posture by 3D pose estimation algorithm. The 3D pose estimation algorithm may be referred to theses "Synthesizing stereo 3D views from focus cues in monoscopic 2D images" by Ramon M. Rodriguez-Dagnino. "Globally Optimal O(n) Solution to the PnP Problem for General Camera Models" by Gerald Schweighofer, "Synthesizing stereo 3D views from focus cues in monoscopic 2D images" by Ramon M. Rodriguez-Dagnino, but not limited to.

Step S85: The processor 1210 processes the application controls according to location information of a single operating frame or the variation of location information of successive operating frames, e.g. controlling a cursor, game parameters, without particular limitations.

Referring to FIG. 9, in one embodiment, it is possible that a user holds two remote controllers 8100 and 8300 at the same time. Because each of the remote controllers 8100 and 8300 is able to establish a 3D coordinate space with respect to the user and/or the background regions according to the method mentioned above (FIG. 5 or 8), the 3D coordinate space of the two remote controllers 8100 and 8300 is combinable by the matrix transformation to allow the two remote controllers 8100 and 8300 to know the relative positional relationship of each other. Furthermore, the user is further able to perform the interaction or the gesture with two hands.

It should be mentioned that in the descriptions above, the location information of the remote controller 1000 is the location information of the camera 1200 since the camera 1200 is included in the remote controller 1000.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A remote controller, comprising:
   a camera configured to capture an initial operating frame and a current operating frame each comprising a user image and a background image;

a storage element configured to store the initial operating frame, and a predetermined depth map and a predetermined location information corresponding to the initial operating frame; and a processor configured to change the predetermined location information and the predetermined depth map to generate a plurality of estimated image frames according to the initial operating frame, compare the estimated image frames with the current operating frame to obtain a maximum similarity, and set a location information of an optimum estimated image frame associated with the maximum similarity as a current location information of the remote controller.

2. The remote controller as claimed in claim 1, wherein the predetermined location information and the current location information comprise a three-dimensional coordinate and a three-dimensional inclination.

3. The remote controller as claimed in claim 1, wherein the processor is further configured to update the predetermined depth map according to the current location information.

4. The remote controller as claimed in claim 1, wherein the processor is further configured to recognize user image regions and background image regions within the initial operating frame and the current operating frame.

5. The remote controller as claimed in claim 4, wherein the processor is configured to compare a similarity of at least one of the user image region and the background image region within the current operating frame with a corresponding region within the estimated image frames.

6. The remote controller as claimed in claim 1, wherein the remote controller comprises a first side and a second side opposite to each other, and the camera is disposed at the first side and a light source is disposed at the second side.

7. An operating method of a remote controller, the remote controller comprising a camera, the operating method comprising:

capturing, by the camera, an initial operating frame and a current operating frame each comprising a user image and a background image;

changing a predetermined location information and a predetermined depth map corresponding to the initial operating frame to generate a plurality of estimated image frames;

comparing the estimated image frames with the current operating frame to obtain an optimum estimated image frame; and outputting a location information corresponding to the optimum estimated image frame configured as a current location information of the remote controller.

8. The operating method as claimed in claim 7, further comprising:

updating the predetermined depth map according to the current location information.

9. The operating method as claimed in claim 7, further comprising:

recognizing user image regions and background image regions within the initial operating frame and the current operating frame.

10. The operating method as claimed in claim 9, further comprising:

comparing a similarity of at least one of the user image region and the background image region within the current operating frame with a corresponding region within the estimated image frames.

11. The operating method as claimed in claim 10, wherein the similarity is obtained by calculating a correlation between at least one of the user image region and the background image region within the current operating frame and the corresponding region within the estimated image frames.

12. The operating method as claimed in claim 7, wherein the optimum estimated image frame is one of the estimated image frames having a highest similarity with the current operating frame.

13. An interactive system, the interactive system comprising:

a remote controller, the remote controller comprising:

a camera configured to capture an operating frame comprising at least a user image; and a processor configured to receive the operating frame, retrieve a face image from the operating frame, compare the face image with face feature database to generate a face feature information; and compare the face feature information with face geometry database to obtain a camera posture of the camera.

14. The interactive system as claimed in claim 13, wherein the face feature information comprises two-dimensional locations of a plurality of face features, the face geometry database comprises three-dimensional locations of the face features, and the camera posture comprises a three-dimensional coordinate and three-dimensional inclination.

* * * * *